(12) United States Patent
Greenberg et al.

(10) Patent No.: US 9,939,132 B2
(45) Date of Patent: Apr. 10, 2018

(54) RFI SHIELDING FOR LUMINAIRES USING REFLECTION OPTICS

(71) Applicant: iUNU, LLC, University Place, WA (US)

(72) Inventors: Adam Phillip Takla Greenberg, San Francisco, CA (US); Kyle Terrence James Rooney, Seattle, WA (US); Travis Anthony Conrad, Bellvue, WA (US)

(73) Assignee: IUNU, INC., Seattle, WA (US)

( * ) Notice: Subject to any disclaimer, the term of this patent is extended or adjusted under 35 U.S.C. 154(b) by 269 days.

(21) Appl. No.: 14/802,928

(22) Filed: Jul. 17, 2015

(65) Prior Publication Data

US 2016/0018084 A1    Jan. 21, 2016

Related U.S. Application Data

(60) Provisional application No. 62/026,239, filed on Jul. 18, 2014.

(51) Int. Cl.
| | |
|---|---|
| *F21V 15/01* | (2006.01) |
| *H01J 61/56* | (2006.01) |
| *H01J 65/04* | (2006.01) |
| *F21V 15/00* | (2015.01) |
| *A01G 9/26* | (2006.01) |
| *H01J 61/02* | (2006.01) |
| *F21V 3/04* | (2018.01) |
| *F21V 7/04* | (2006.01) |
| *F21V 7/22* | (2018.01) |

(Continued)

(52) U.S. Cl.
CPC ............... *F21V 15/01* (2013.01); *A01G 9/26* (2013.01); *F21V 15/00* (2013.01); *H01J 61/56* (2013.01); *H01J 65/042* (2013.01); *F21V 3/04* (2013.01); *F21V 7/048* (2013.01); *F21V 7/22* (2013.01); *F21W 2131/40* (2013.01); *F21Y 2115/10* (2016.08); *H01J 61/025* (2013.01)

(58) Field of Classification Search
CPC . A01G 9/26; F21V 15/00; F21V 15/01; F21V 3/04; F21V 7/048; F21V 7/22; H01J 61/56; H01J 61/025; H01J 65/042; H01J 65/044; F21W 2131/40
USPC ....... 362/265, 373, 263; 313/231.31, 231.61, 313/231.71
See application file for complete search history.

(56) References Cited

U.S. PATENT DOCUMENTS 7,429,818 B2 * 9/2008 Chang ................ H01J 7/46
                                          313/231.01
8,022,627 B2 * 9/2011 Stockwald ............ H01J 5/48
                                          313/567

(Continued)

*Primary Examiner* — Anh Mai
*Assistant Examiner* — Arman B Fallahkhair
(74) *Attorney, Agent, or Firm* — Han Santos, PLLC; Andrew J. Cameron

(57) ABSTRACT

Shielding radio frequency interference (RFI) using reflector optics is disclosed. A simplified non-sealed reflector is used in conjunction with a mounting system, resulting in desired amounts of visible and non-visible light using radio frequency driven luminaires and emitters without sacrificing output or coverage area. Configurations are disclosed such that achieved RF grounding is compliant with FCC regulations. Accordingly, the disclosed RFI shielding improves optical design options, increased output, and decreased manufacturing costs over traditional sealed enclosures.

16 Claims, 7 Drawing Sheets

(51) Int. Cl.
*F21W 131/40* (2006.01)
*F21Y 115/10* (2016.01)

(56) References Cited

U.S. PATENT DOCUMENTS

| | | | | |
|---|---|---|---|---|
| 8,102,123 B2* | 1/2012 | Espiau | ................. | H01J 65/042 |
| | | | | 315/111.01 |
| 8,690,391 B2* | 4/2014 | Drake | ................... | F21V 11/183 |
| | | | | 362/247 |
| 8,860,311 B2* | 10/2014 | Rea | ....................... | A01G 7/045 |
| | | | | 315/112 |
| 2014/0175979 A1* | 6/2014 | Rea | ....................... | F21V 7/0025 |
| | | | | 315/85 |

* cited by examiner

RFI SHIELDING FOR LUMINAIRES USING REFLECTION OPTICS

CROSS REFERENCE TO RELATED PATENT APPLICATION

This patent application claims priority from U.S. Provisional Application No. 62/026,239, filed Jul. 18, 2014, which application is hereby incorporated in its entirety by reference.

BACKGROUND

Electronic systems produce and are susceptible to electromagnetic interference (EMI), created through either electromagnetic induction or electromagnetic radiation from an external source. In the context of radio waves, radio frequency interference (RFI), is produced. The interference created has the potential to interrupt, deteriorate, or cause other unwanted performance in many common devices ranging from radios to cellular phones to televisions. Federal Communications Commission (FCC) requirements for the mitigation RFI are extremely strict, down to microvolts, thus it is important RFI be mitigated using appropriate radio frequency (RF) grounding.

To suppress RFI radiation, many enclosures are designed to form a sealed container for whatever may be producing the RFI. For example, an integrated circuit (IC) chip generating radio frequencies for a plasma lighting system may be contained within a housing that is sealed using the correct RFI gaskets. What is more difficult is the containment of RFI that escapes through the bulb of a lighting system that uses radio waves, i.e. plasma lighting. To contain the RFI produced from the light source, complicated housings, referred to from here on as "RFI Boxes", must be employed to contain the escaping radiation. Conventional hardware required to successfully contain RFI from a light source as described above includes a sealable cavity to which the light source is attached, a gasket, and a piece of glass which is sealed against the gasket using a fastened flange.

However, these additional materials add cost to the production process as well as time to assembly. Moreover, present RFI boxes cause a loss of total electromagnetic output per area of coverage i.e. watts per square meter, also known as irradiance. Irradiance comprises not only the visible spectrum, but UVB and infrared wavelengths as well. Additionally, glass reduces output by an additional eight percent, and blocks the beneficial UV wavelengths UVA and UVB. Some plasma technologies produce UVC, which demands the use of glass to filter this wavelength out which can cause damage on the cellular level.

Aside from these concerns, the geometry of conventional RFI boxes for lamps causes coverage area to be diminished considerably, requiring increased distance from a desired coverage plane to reach a desired coverage area. For example in terms of horticulture, coverage of a 4 foot by 4 foot area should be achievable at 12 to 18 inches from the desired plane, i.e. the canopy, to produce adequate intensity for growth. When using a conventional RFI box, this distance must be increased dramatically, causing output at the desired plane to be less than optimal.

BRIEF DESCRIPTION OF THE DRAWINGS

The Detailed Description is set forth with reference to the accompanying figures.

DETAILED DESCRIPTION

This disclosure describes, in part, a luminaire which utilizes an optical reflector in conjunction with a mounting system capable of shielding RFI produced by a lamp.

In various embodiments, the optical reflector may be any device, used to guide or manipulate in any way, electromagnetic output of a luminaire. Each luminaire may contain one or more light sources used in tandem, depending on the design.

In various embodiments, the lamp may be any lamp capable of generating EMI or RFI when operating. EMI would be generated by light sources such as high intensity discharge (HID), LED, incandescent, etc. whereas RFI would be generated by light sources driven by RE such as a plasma light source.

In some embodiments, a mounting system may be any method of ensuring physical contact between conductive components in order to shield radiated electromagnetic waves from leaving the luminaire.

The luminaire of this disclosure may allow energy from radiated RF electromagnetic waves to be conducted to ground as an electrical current, thus minimizing radiated electromagnetic waves that leave the fixture after being emitted from the lighting apparatus. In various embodiments, the luminaire may be controlled by a network controller. The network controller operable to connect to a master control software program, via a communications network. The master control software program may be configured to control the horticultural light's output spectrum.

Figure 1:
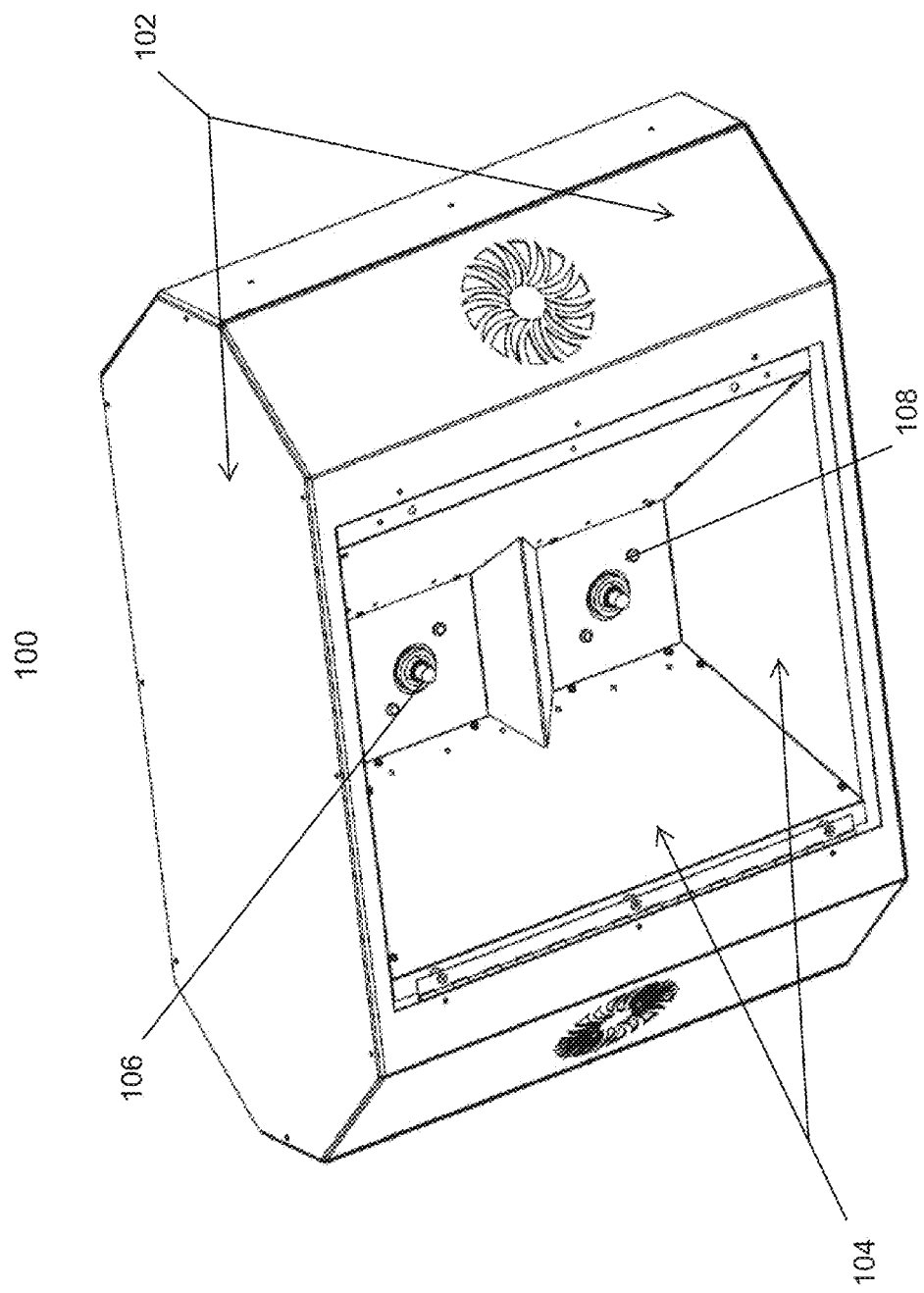
FIG. 1 is a luminaire for horticulture utilizing reflection optics to shield lamp RFI.

FIG. 1 is a luminaire 100. The luminaire 100 may be a horticultural lighting fixture. The lighting fixture 100 may include a housing 102, an optical reflector 104, a lamp 106, and a conductive fastener 108. The fastener may fasten at least a one surface of the lamp 106 to be in physical contact with at least one surface the reflector 104.

The housing 102 may be constructed of electrically conductive material, such as a metal or an engineered polymer. The housing 102 may include a housing opening, through which light may be emitted by a lamp 106 and directed by an optical reflector 104. In some embodiments, the housing may be constructed at least partially of an engineered polymer that may contain metal fibers that make the engineered polymer conductive.

In various embodiments, the housing 102 may enclose internal components of the luminaire 100. The housing 102 may be constructed of housing components fastened together. In alternative embodiments, the housing 102 may be constructed as one solid component.

As illustrated, a luminaire 100 may include optical reflector 104. The optical reflector 104 may provide adequate RFT shielding by being secured to the lamp 106 using a conductive fastener 108.

In various embodiments, the luminaire 100 may be any sort of device capable of producing visible and non-visible light, such as a light-emitting plasma luminaire. Alternatively, the luminaire 100 may produce another type of light that may use radio frequencies to produce electromagnetic energy. The optical reflector 104 may be any sort of device capable of reflecting light output produced by the lamp 106. The optical reflector 104 may possess varying geometry. In various embodiments, the optical reflector 104 may a horizontal surface through which at least one bulb may protrude. Additionally, the horizontal surface may have holes through which prongs of a whisker assembly may protrude around the bulb in order for the prongs of the whisker assembly to serve as an added faraday cage. The whisker assembly is described in detail in FIG. 4.

The optical reflector may additionally have a plurality of surfaces for reflecting light set at an angle of 135 degrees with respect to the horizontal surface, or set at an angle of 45 degrees with respect to the horizontal plane of the housing opening.

The lamp 106 in various embodiments may be any device capable of producing electromagnetic energy within the visible spectrum as well as beyond the visible spectrum, such as UV wavelength below 400 nm, or infrared wavelengths above 700 nm. The lamp 106 may utilize lighting technologies such as plasma, LED, HID, or any other form of lighting technology.

The lamp 106 may comprise a resonator and a bulb. The resonator may receive a radio frequency (RF) output signal from a driver and may emit a concentrated RF field based on the RE output signal. The RE field may drive a bulb to emit light through the housing opening.

The lamp 106 may be a source of stray radio waves which require shielding through the methods described herein. By conductively coupling the optical reflector 104 to the lamp 106, the optical reflector 104 may be an RF shielding component.

In some embodiments, the optical reflector 104 is conductively coupled to a chassis, to which the lamp 106 is in turn conductively fastened to the chassis. A chassis may be constructed of electrically conductive material, such as a metal or a metal polymer. The chassis is described in further detail in the detailed description of FIG. 2.

A conductive fastener 108 may be any fastener capable of maintaining physical contact between the optic reflector 104 and the lamp 106 to produce adequate RF grounding between the lamp and the rest of the fixture, including the housing 102.

By ensuring contact, all components may be interconnected, allowing stray radio waves from the lamp to be captured and grounded to prevent interference with the light output and other sensitive components. The conductive fastener 108 may be a machine screw, bolt, or any other fastener capable of providing contact between the optical reflector 104 and the lamp 106.

Figure 2:
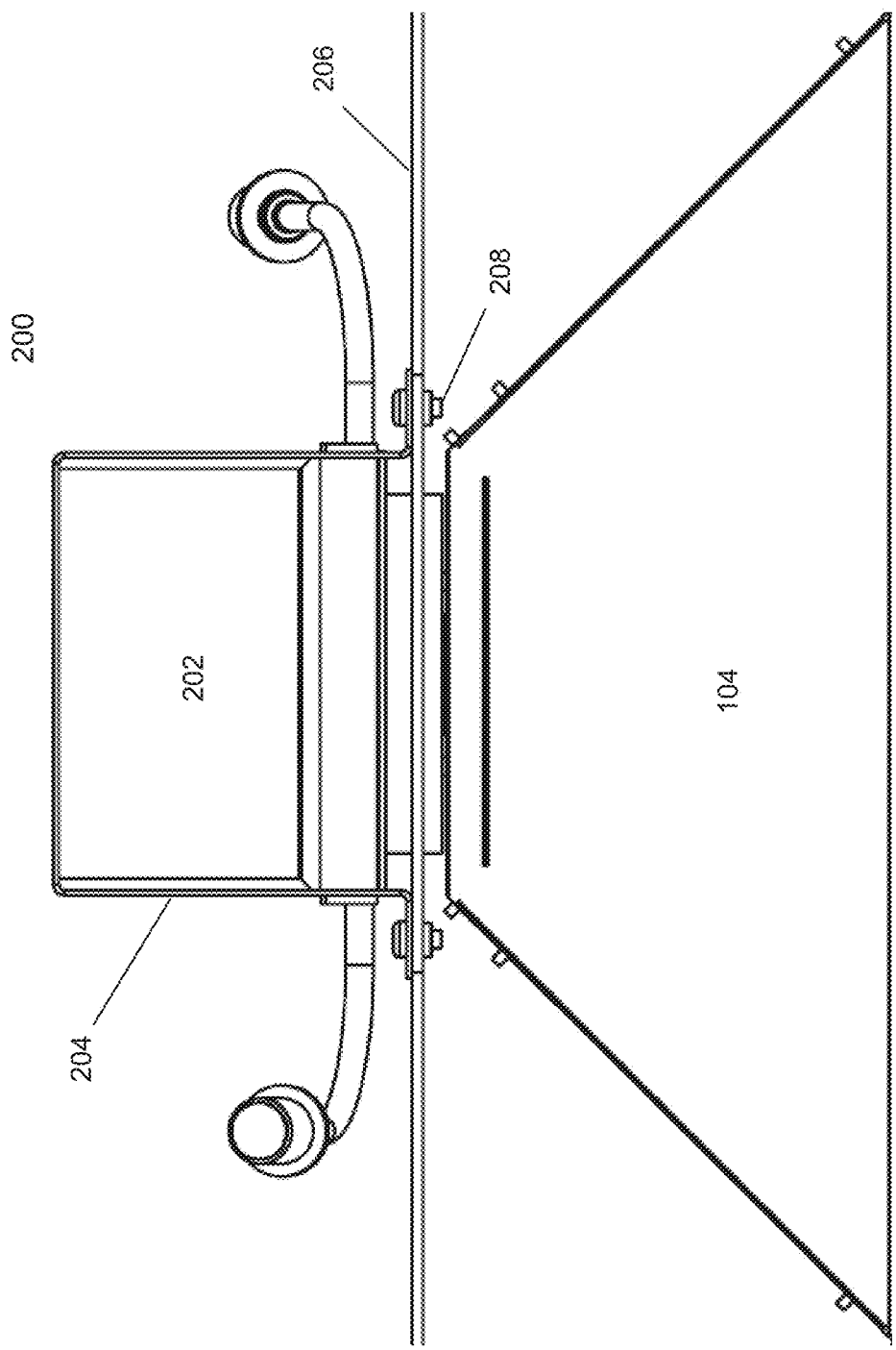
FIG. 2 is a side view of a lamp assembly mounted to a frame with a bracket.

FIG. 2 is a side view 200 of a lamp module 202 as it is shown underneath the housing 102. The lamp module 202 may be coupled to the lamp 106. The lamp module 202 may be fastened to a mounting bracket 204, which may be fastened to a chassis 206. The chassis 206 may be in turn mounted to the housing. The chassis may include at least one electrically conductive surface.

The mounting bracket 204 may provide adequate grounding in conjunction with the optical reflector 104 by being secured to a chassis 206 using an adequate fastener 208 to ensure proper contact between metallic surfaces. The fastener 208 may be a conductive fastener, and may be machine screw, bolt, or any other fastener capable of providing contact between the optical reflector 104 and the lamp module 202.

The lamp module 202 may be any device requiring RF grounding to function as desired, such as plasma, lighting.

In some embodiments, the mounting bracket 204 may be any device capable of securing the lamp module 202 to a chassis 206. The bracket 204 ensures the optical reflector 104 is in continuous contact with the chassis 206 through contact with the lamp module 202. The continuity of contact between all components may ensure that stray RF signals are grounded and that unwanted effects may be mitigated.

In some embodiments, the chassis 206 may be any device capable of supporting components as well as providing a common point for radio grounding to occur. The chassis 206 in many instances may be a metallic material or other material capable of grounding stray RF signals through contact with an EMI shield such as an optical reflector 104.

In various embodiments, the fastener 208 may be any device capable of providing firm contact between the lamp module 202, the bracket 204, and the chassis 206, or any combination of these devices. The efficacy of the optical reflector 104 as an EMI shield may be reliant on the physical contact established through all previously mentioned devices. The fastener 208 may include the combination of a nut and bolt, a threaded insert and bolt, or any other fastening method capable of providing firm contact.

Figure 3:
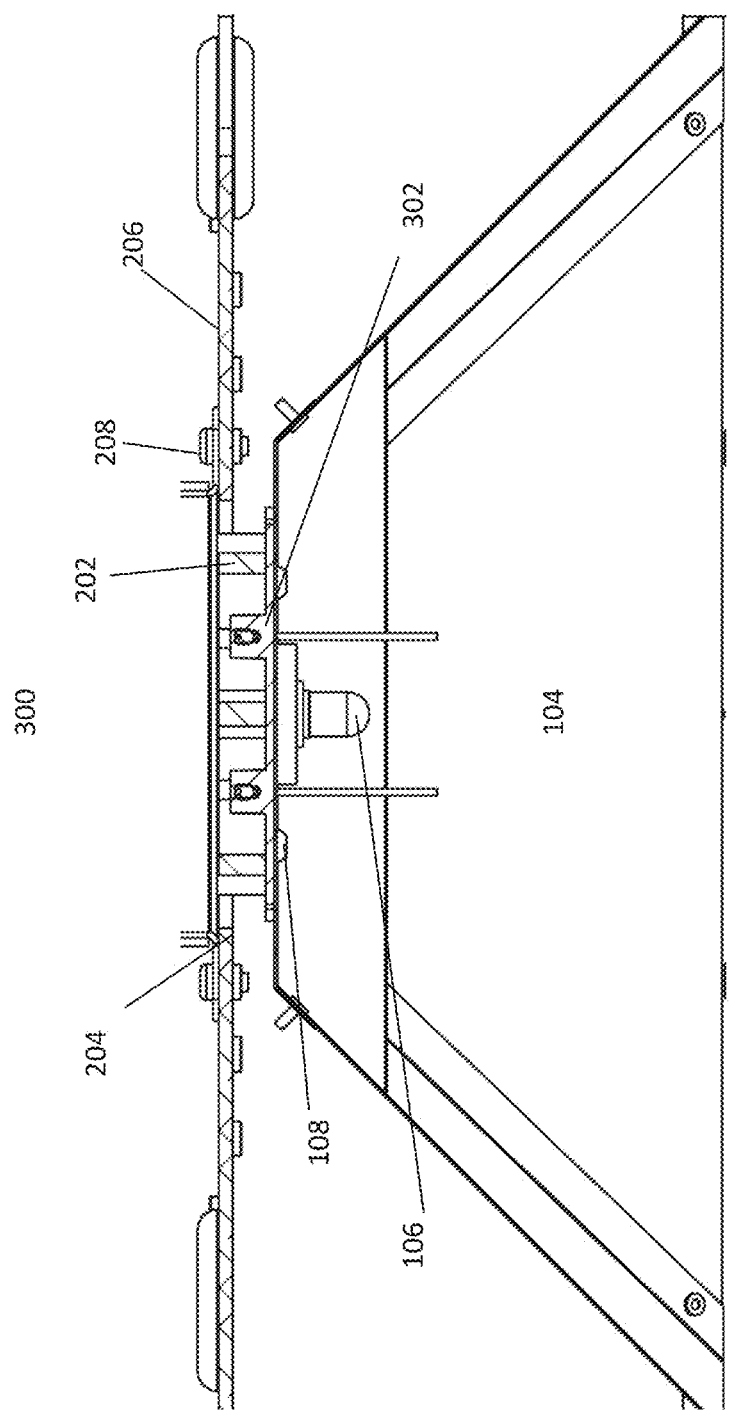
FIG. 3 is a section view of an exemplary RF shielding contact between a reflector and a lamp.

FIG. 3 is a section view 300 of FIG. 2 that may provide clarity on the physical interaction between previously described components. The optical reflector 104 and the lamp 106 are described above in detail with regard to FIG. 1. The lamp module 202, the mounting bracket 204, the chassis 206, and the fastening method 208 are described in detail above with regard to FIG. 2. As previously described, the physical contact made between the optical reflector 104 and the lamp module 202 is made possible by the conductive fastener 108.

The Whisker assembly 302 may be coupled to the chassis 206 by a conductive fastener 108. The whisker assembly 302 may have a metallic base and an array of metallic prongs perpendicularly extending from the metallic base. Each metallic prong may be a steel wire at least one inch long and may be between 0.04" and 0.06' in diameter. The whisker assembly 302 may act as a faraday cage and may shield or absorb a portion of RFI.

Figure 4:
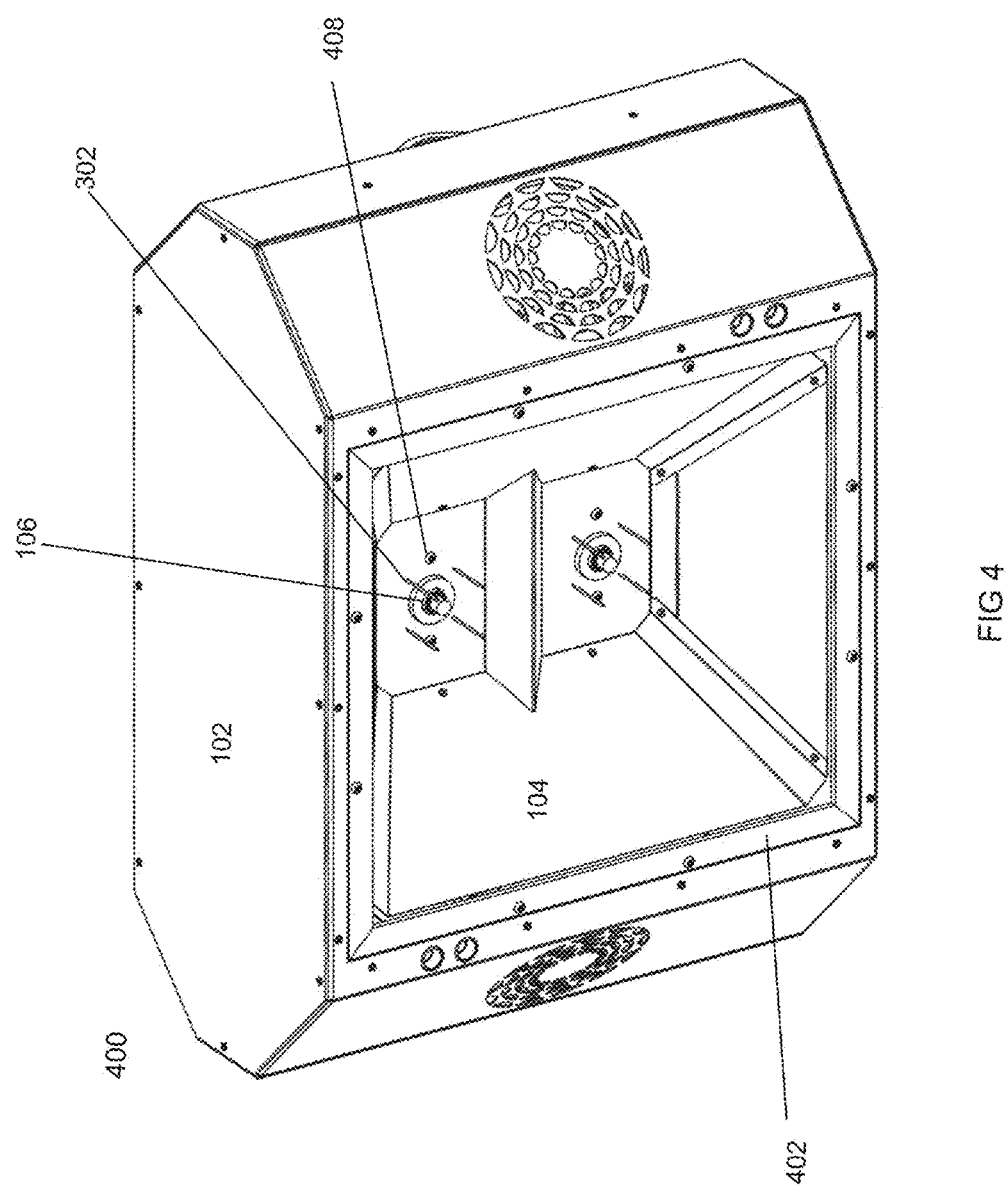
FIG. 4 is a luminaire for horticulture utilizing reflection optics and a whisker assembly.

FIG. 4 is an exemplary horticultural luminaire 400 utilizing an optical reflector 104, a whisker assembly 302, and a wire mesh frame 402. The optical reflector 104 is described in detail above with regard to FIG. 1. The whisker assembly 302 is described in detail above with regard to FIG. 3. The wire mesh frame 402 may be used to allow wire mesh screen to extend across the housing opening, thus increase performance of RFI shielding while allowing greater than 80% light transmission.

In some embodiments, the metallic base may be coupled between the optical reflector 104 and the lamp module 202. The array of metallic prongs may positioned so that the bulb is positioned within the array. The array of metallic prongs may protruding through a corresponding set of holes in the optical reflector 104.

Alternatively, the metallic base may be clipped onto an exposed surface of optical reflector 104 surrounding the bulb, and the array of metallic prongs positioned so that the bulb is positioned within the array. In some embodiments, the array of metallic prongs may comprise at least three metallic prongs equally spaced.

In some embodiments, the whisker assembly may be at least partially constructed of aluminum.

Figure 5:
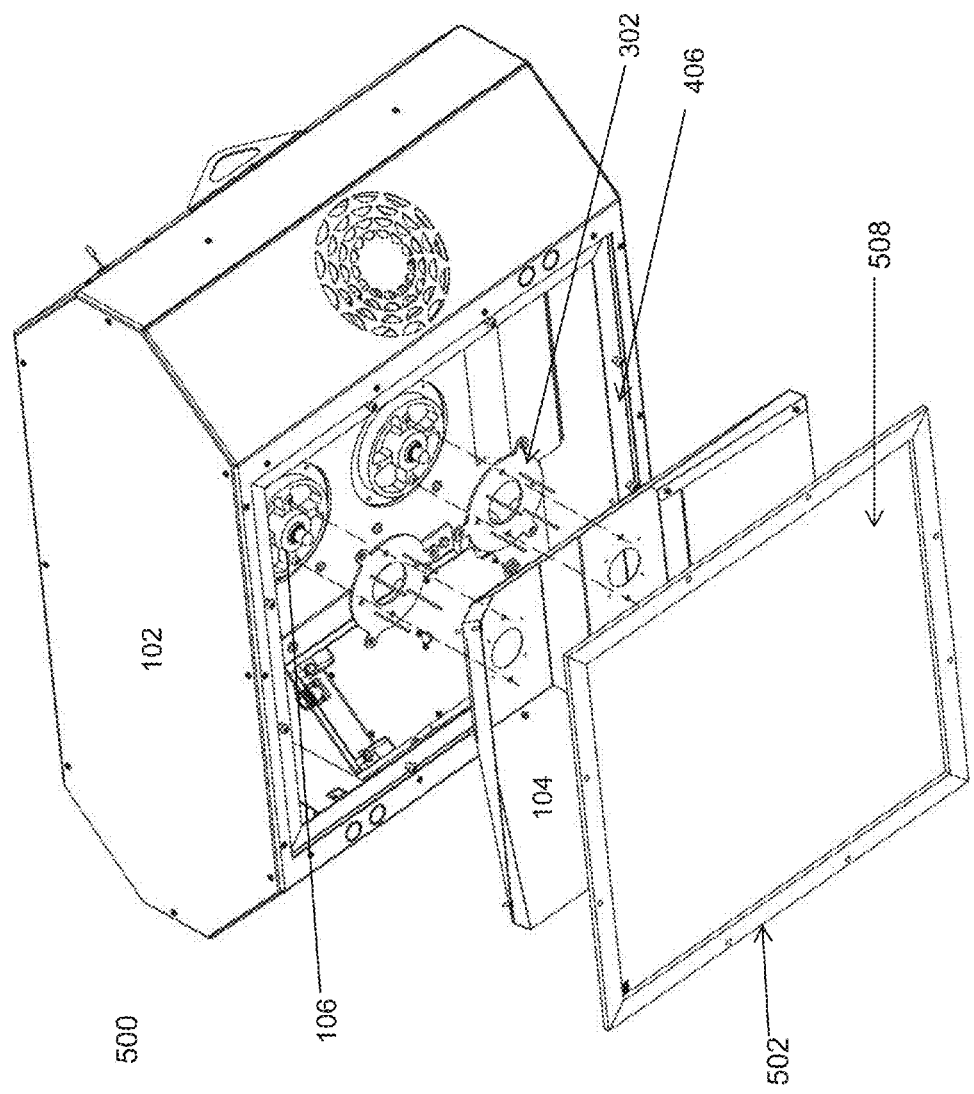
FIG. 5 is an exploded view of an exemplary luminaire for horticulture utilizing reflection optics, a whisker assembly, and a wire mesh screen to shield lamp RFI.

FIG. 5 is an exploded view 500 of an exemplary luminaire for horticulture utilizing an optical reflector 104, a whisker assembly 302, a bracket 406, and a wire mesh screen 508 to shield lamp RFI.

The wire mesh screen 508 may be coupled to the housing 102. The wire mesh screen may be fastened to a wire mesh frame 502. The wire mesh screen may extend across the housing opening and may be configured to absorb at least a portion of the RF field emitted by the resonator.

The wire mesh screen may be configured to have a transparency of 88% (50 openings per inch [OPI]). In some embodiments, the wire mesh screen may have a transparency as low as 100 OPI, which may more effectively shield RFI and EMI.

In some embodiments, the wire mesh screen may be at least partially constructed from a ferrous material or a nickel alloy.

Figure 6:
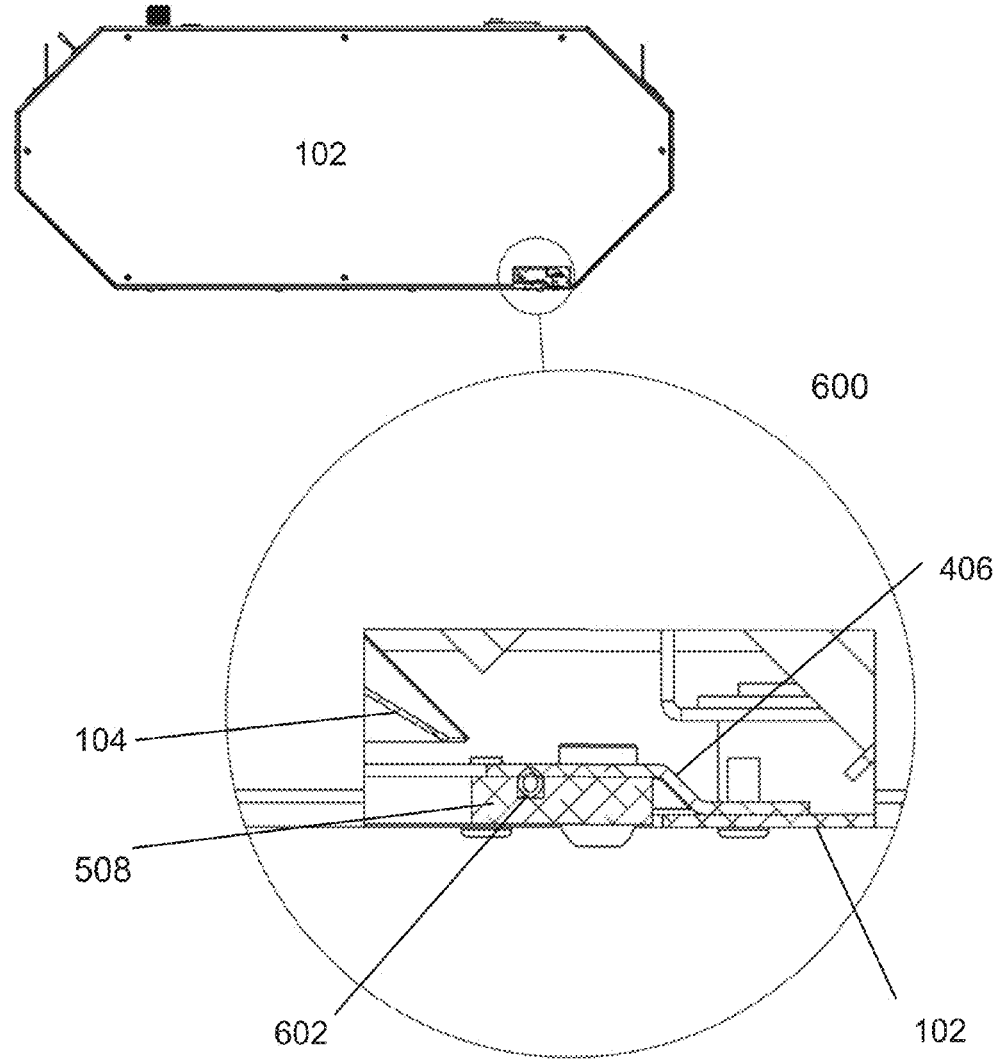
FIG. 6 is a section view of an exemplary wire mesh shield assembly mounted to a fixture housing.

FIG. 6 is a section view 600 of an exemplary wire mesh shield assembly mounted to a fixture housing.

The wire mesh screen 508 may be coupled to a conductive gasket 602. The conductive gasket 602 may be configured to hold a portion of the wire mesh screen 508 into a corresponding gasket groove in the bracket 406. A wire mesh frame 402 may mount to at least one bracket 406 in a plurality of locations. In several embodiments, the number of mounting locations may be more than seven. A conductive adhesive may bond the perimeter of the wire mesh screen 508 to the wire mesh frame 402 utilizing the corresponding gasket groove.

Figure 7:
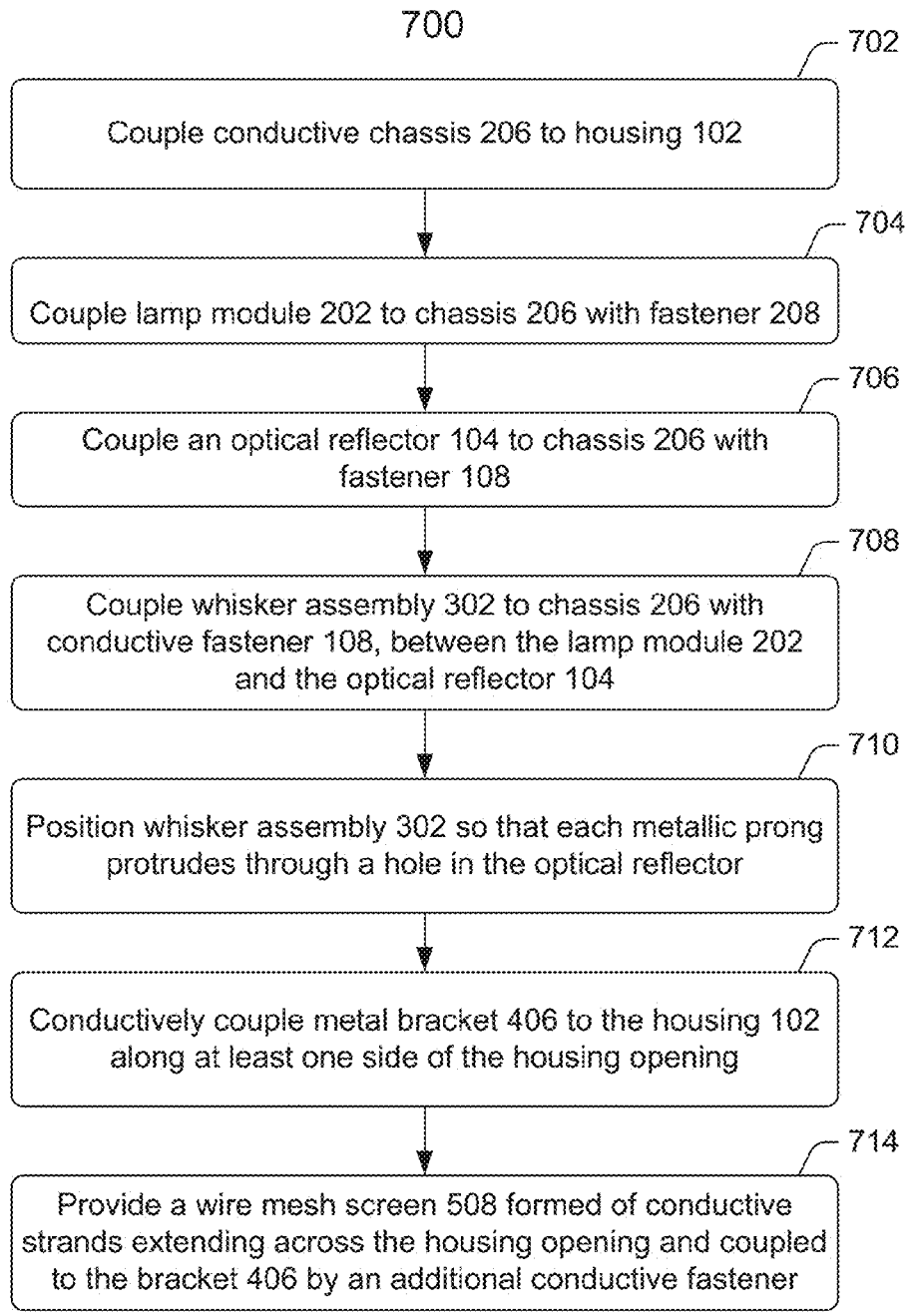
FIG. 7 is flow diagram of an exemplary method of RFI shielding for a horticultural lighting system.

FIG. 7 is flow diagram of an exemplary method 700 of RFI shielding for a horticultural lighting system.

At 702, the chassis 206 may be coupled to the housing 102.

At 704, the lamp module 202 may be coupled to the chassis 206 with a conductive fastener.

At 706, the optical reflector 104 may be coupled to chassis 206 with a conductive fastener 108.

At 708, whisker assembly 302 may be coupled to chassis 206 with conductive fastener 108, positioned between the lamp module 202 and the optical reflector 104.

At 710, the whisker assembly 302 may be positioned so that the array of metallic prong protrudes through a corresponding set of holes in the optical reflector.

At 712, mounting bracket 204 may be coupled to the housing 102 along at least one side of the housing opening.

At 714, a wire mesh screen 508 may be coupled to the mounting bracket by an additional conductive fastener. The wire mesh screen may be formed of woven conductive strands extending across the housing opening.

Accordingly, an RF grounding path may be provided from each shielding component to the housing.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A horticultural lighting apparatus comprising:
a chassis coupled to a housing having a housing opening, the chassis constructed at least partially of an electrically conductive material, and the housing configured to be electrically conductive to the chassis;
a lamp module conductively coupled to the chassis, the lamp module including a bulb to emit light through the housing opening in response to an emitted radio frequency (RF) field that drives the bulb to emit the light;
an optical reflector located in the housing and conductively coupled to the chassis, the optical reflector absorbing at least a portion of the emitted RF field and reflectively directing the light emitted from the bulb through the housing opening;
a grounding path formed by conductive coupling of the optical reflector to the chassis, the grounding path conducts RF electromagnetic waves of the RF field absorbed by the optical reflector as an electrical current to ground; and
a wire mesh screen coupled to the housing that includes wire mesh extending across the housing opening, the wire mesh configured to absorb at least an additional portion of the emitted RF field, wherein a perimeter of the housing opening includes a bracket equipped with a gasket groove, and wherein the wire mesh screen is enclosed by a wire mesh frame that is coupled to a conductive gasket, the conductive gasket fitting into the gasket groove and holding the wire mesh frame to the bracket of the housing opening.

2. The horticultural lighting apparatus of claim 1, further comprising a whisker assembly conductively coupled to the chassis, the whisker assembly having a metallic base and an array of metallic prongs perpendicularly extending from the metallic base, the metallic base coupled between the optical reflector and the lamp module, the array of metallic prongs positioned so that the bulb is position within the array, and each metallic prong protruding through a corresponding hole in the optical reflector.

3. The horticultural lighting apparatus of claim 2, wherein the array of metallic prongs comprises at least four metallic prongs equally spaced.

4. The horticultural lighting apparatus of claim 2, wherein the whisker assembly is at least partially constructed of aluminum.

5. The horticultural lighting apparatus of claim 1, wherein the bulb is a plasma bulb.

6. The horticultural lighting apparatus of claim 1, wherein the optical reflector further comprises:
a horizontal surface through which at least one bulb may extrude; and
a plurality of surfaces configured to reflect light at an angle of 135 degrees with respect to the horizontal surface.

7. The horticultural lighting apparatus of claim 1, further comprising a network controller, the network controller operable to connect to a master control software program via a communications network, wherein the master control software program is configured to control an output spectrum of the bulb.

8. The horticultural lighting apparatus of claim 1, further comprising a mounting bracket that is fastened to the lamp module, wherein the mounting bracket is conductively coupled to the chassis by a conductive fastener.

9. The horticultural lighting apparatus of claim 1, further comprising a whisker assembly conductively coupled to the chassis, the whisker assembly having a metallic base and an array of metallic prongs perpendicularly extending from the metallic base, the metallic base clipped onto an exposed surface of optical reflector surrounding the lamp module, and the array of metallic prongs positioned so that the bulb is positioned within the array.

10. The horticultural lighting apparatus of claim 1, wherein the wire mesh screen is at least partially constructed from a ferrous material or a nickel alloy.

11. The horticultural lighting apparatus of claim 1, further comprising a conductive adhesive that joins the conductive gasket of the wire mesh frame to the gasket groove.

12. A method for RF shielding in a horticultural lighting system, the method comprising:
coupling a chassis to a housing that is electrically conductive, the housing including a housing opening, the chassis constructed at least partially of an electrically conductive material;
coupling a lamp module conductively to the chassis, the lamp module including a bulb to emit light through the housing opening in response to an emitted radio frequency (RF) field that drives the bulb to emit the light;
conductively fastening an optical reflector to the chassis with the conductive fastener, the optical reflector absorbing at least a portion of the emitted RF field and reflectively directing the light emitted from the bulb through the housing opening;
providing an RF grounding path from the chassis to the optical reflector via the conductive fastener to conduct RF electromagnetic waves of the RF field absorbed by the optical reflector as an electrical current to ground; and
coupling a wire mesh screen to the housing, the wire mesh screen to absorb at least an additional portion of the emitted RF field, wherein the wire mesh screen extends across the housing opening, and wherein coupling the wire mesh screen to the housing includes fitting a conductive gasket into a gasket groove of a bracket of the housing opening to hold at least a portion of the wire mesh screen in the gasket groove.

13. The method of claim 12, further comprising:
conductively coupling a whisker assembly to the optical reflector, the whisker assembly having a metallic base, a base hole, and an array of metallic prongs perpendicularly extending from the metallic base, wherein the conductively coupling a whisker assembly to the optical reflector further comprises positioning the whisker assembly so that the bulb is within the array of metallic prongs; and
providing an RF grounding path from whisker assembly to the housing, wherein the whisker assembly absorbs at least an additional portion of the emitted RF field.

14. The method of claim 13, wherein the whisker assembly is electrically coupled to the optical reflector by clipping at least a portion of the metallic base to at least a portion of the optical reflector.

15. The method of claim 12, further comprising:
mounting a whisker assembly to the chassis with the conductive fastener, the whisker assembly including a metallic base having a base hole, and an array of metallic prongs extending from the metallic base, wherein the mounting a whisker assembly to the chassis with a conductive fastener further includes:
positioning the metallic base between the optical reflector and the lamp module so that the bulb protrudes through the base hole in the metallic base of the whisker assembly; and
positioning the array of metallic prongs so that the bulb is placed within the array and so that each metallic prong protrudes through a corresponding hole in the optical reflector, wherein each metallic prong of the array is configured to absorb at least an additional portion of the emitted RF field without being in direct conductive contact with another metallic prong of the array; and
providing an RF grounding path from the whisker assembly to the chassis.

16. A horticultural lighting apparatus comprising:
a chassis mounted to a housing having a housing opening, the chassis constructed at least partially of an electrically conductive material, and the housing configured to be electrically conductive to the chassis;
a lamp module coupled to the chassis, the lamp module including a plasma bulb to emit light through the housing opening in response to an emitted radio frequency (RF) field that drives the plasma bulb to emit the light;
an optical reflector located in the housing and conductively coupled to the chassis, the optical reflector absorbing at least a portion of the emitted RF field and reflectively directing the light emitted from the plasma bulb through the housing opening;
a whisker assembly coupled to the chassis, the whisker assembly having a metallic base and an array of metallic prongs perpendicularly extending from the metallic base, the metallic base positioned between the optical reflector and the lamp module, the array of metallic prongs positioned so that the bulb is within the array, and each metallic prong protruding through a corresponding hole in the optical reflector and configured to absorb at least an additional portion of the emitted RF field without being in direct conductive contact with another metallic prong of the array;
a metal bracket conductively coupled to the housing and positioned on each side of the housing opening, wherein the metal bracket includes a gasket groove; and
a wire mesh screen conductively coupled to the metal bracket, the wire mesh screen formed of woven conductive strands extending across the housing opening, and configured to absorb at least a second additional portion of the emitted RF field, wherein the wire mesh screen is enclosed by a wire mesh frame that is coupled to a conductive gasket, the conductive gasket fitting into the gasket groove and holding the wire mesh frame to the metal bracket.

* * * * *